(12) United States Patent
Eisenbach et al.

(10) Patent No.: US 12,529,878 B2
(45) Date of Patent: Jan. 20, 2026

(54) HIGH CONTRAST IMAGING IN BONDED SAMPLE METROLOGY USING OBLIQUE ILLUMINATION

(71) Applicant: KLA Corporation, Milpitas, CA (US)

(72) Inventors: Shlomo Eisenbach, Kfar Pines (IL); Yoav Grauer, Haifa (IL); Motti Penia, Migdal Ha'emek (IL); Andrew V. Hill, Sunriver, OR (US); Avner Safrani, Misgav (IL); Arkady Simkin, Migdal Ha'emek (IL)

(73) Assignee: KLA Corporation, Milpitas, CA (US)

( * ) Notice: Subject to any disclaimer, the term of this patent is extended or adjusted under 35 U.S.C. 154(b) by 8 days.

(21) Appl. No.: 18/617,127

(22) Filed: Mar. 26, 2024

(65) Prior Publication Data

US 2025/0306353 A1   Oct. 2, 2025

(51) Int. Cl.
*G02B 21/10*      (2006.01)
*G01B 11/06*      (2006.01)
(Continued)

(52) U.S. Cl.
CPC .............. *G02B 21/10* (2013.01); *G01B 11/06* (2013.01); *G01B 11/272* (2013.01);
(Continued)

(58) Field of Classification Search
CPC ...... G02B 21/10; G02B 21/365; G01B 11/06; G01B 11/272; G01N 21/8851;
(Continued)

(56) References Cited

U.S. PATENT DOCUMENTS 8,067,077 B2 * 11/2011 Bauer ..................... H01Q 1/22
                                                428/40.9
8,934,052 B2 *  1/2015 Luan ..................... H10F 39/804
                                                348/374
(Continued)

OTHER PUBLICATIONS

Bakolias et al., "Dark Field, Scheimpflug imaging for surface inspection," SPIE: Machine Vision Applications in Industrial Inspection V, vol. 3029, Apr. 15, 1997, pp. 57-68.
(Continued)

*Primary Examiner* — Frank F Huang
(74) *Attorney, Agent, or Firm* — Suiter Swantz IP

(57) ABSTRACT

An illumination system for dark-field imaging may include one or more illumination sources providing temporally incoherent light with a first spatial profile, and two or more lens assemblies configured to direct the light from the one or more illumination sources as two or more illumination beams to a buried target along optical paths outside an objective lens of an imaging sub-system. The two or more illumination beams may fully overlap at the buried target to provide a common illumination field. The lens assemblies limit numerical apertures of the illumination beams to prevent specular reflection of the illumination beams from entering the objective lens. A respective one of the two or more lens assemblies includes a homogenizer to provide that a respective one of the two or more illumination beams has a second spatial profile with higher spatial uniformity than the first spatial profile according to a selected metric.

26 Claims, 13 Drawing Sheets

(51) Int. Cl.
  *G01B 11/27* (2006.01)
  *G01N 21/88* (2006.01)
  *G02B 21/36* (2006.01)
  *G06T 7/00* (2017.01)

(52) U.S. Cl.
  CPC ....... *G01N 21/8851* (2013.01); *G02B 21/365* (2013.01); *G06T 7/0004* (2013.01); *G01N 2201/061* (2013.01); *G01N 2201/062* (2013.01); *G01N 2201/0631* (2013.01); *G06T 2207/20224* (2013.01); *G06T 2207/30148* (2013.01)

(58) Field of Classification Search
  CPC ....... G01N 2201/061; G01N 2201/062; G01N 2201/0631; G06T 7/0004; G06T 2207/20224; G06T 2207/30148
  See application file for complete search history.

(56) References Cited

U.S. PATENT DOCUMENTS

| | | | | |
|---|---|---|---|---|
| 9,097,375 | B2* | 8/2015 | Hanson | F16J 15/008 |
| 9,976,973 | B2* | 5/2018 | Watkins | G01N 15/134 |
| 10,054,721 | B2* | 8/2018 | Hsu | G02B 7/021 |
| 10,155,824 | B2* | 12/2018 | Fujikawa | A61Q 19/007 |
| 10,347,179 | B2* | 7/2019 | Kim | G09G 3/3266 |
| 2009/0078873 | A1* | 3/2009 | Sakemoto | G01J 5/58 |
| | | | | 250/339.11 |
| 2010/0046059 | A1* | 2/2010 | McCabe | G02B 5/0858 |
| | | | | 359/263 |
| 2011/0144284 | A1* | 6/2011 | Heuer | C08L 69/00 |
| | | | | 525/394 |
| 2013/0106787 | A1* | 5/2013 | Lee | H04N 23/50 |
| | | | | 345/175 |
| 2014/0022373 | A1 | 1/2014 | Kanarowski et al. | |
| 2015/0181099 | A1* | 6/2015 | Van Der Tempel | G01S 7/4911 |
| | | | | 348/135 |
| 2017/0094271 | A1* | 3/2017 | Liu | H04N 19/176 |
| 2017/0220844 | A1* | 8/2017 | Jones | G06V 40/1318 |
| 2018/0048909 | A1* | 2/2018 | Liu | H04N 19/105 |
| 2018/0081093 | A1* | 3/2018 | Wang | H04N 23/20 |
| 2018/0103260 | A1* | 4/2018 | Chuang | H04N 19/70 |
| 2018/0124394 | A1* | 5/2018 | Xu | H04N 19/573 |
| 2018/0152727 | A1* | 5/2018 | Chuang | H04N 19/70 |
| 2021/0072021 | A1 | 3/2021 | Hill et al. | |
| 2021/0356871 | A1 | 11/2021 | Baselmans | |
| 2021/0372645 | A1* | 12/2021 | Harder | F24F 11/52 |
| 2023/0333361 | A1 | 10/2023 | Cang et al. | |

OTHER PUBLICATIONS

Korean Intellectual Property Office, International Search Report and Written Opinion received in International Application No. PCT/US2025/021214, Jul. 10, 2025, 8 pages.

* cited by examiner

HIGH CONTRAST IMAGING IN BONDED SAMPLE METROLOGY USING OBLIQUE ILLUMINATION

TECHNICAL FIELD

The present disclosure relates generally to bonded sample metrology and, more particularly, to high-contrast imaging of features in bonded samples.

BACKGROUND

Many modern semiconductor devices are formed from stacked samples (e.g., wafers, dies, or the like), which may also be referred to as bonded samples. It is critical during the fabrication of such devices to provide accurate imaging of buried features. However, current techniques such as, but not limited to, standard brightfield imaging suffer from low contrast when imaging buried features due to significant reflections from a top surface of a bonded sample and/or absorption in the sample. There is therefore a need to develop systems and methods to cure the above deficiencies.

SUMMARY

In embodiments, the techniques described herein relate to a darkfield imaging system including an imaging sub-system including an objective lens and a detector configured to image a buried target within a volume of a sample; an illumination sub-system, including one or more illumination sources providing light with a first spatial profile; and two or more lens assemblies configured to direct the light from the one or more illumination sources as two or more illumination beams to the buried target along optical paths outside the objective lens, where the two or more illumination beams fully overlap at the buried target to provide a common illumination field, where the two or more lens assemblies limit numerical apertures of the two or more illumination beams to prevent specular reflection of the two or more illumination beams from entering the objective lens, where a respective one of the two or more lens assemblies includes a homogenizer to provide that a respective one of the two or more illumination beams has a second spatial profile with higher spatial uniformity than the first spatial profile according to a selected metric; and a controller communicatively coupled to the detector, the controller including one or more processors configured to execute program instructions causing the one or more processors to receive one or more images of the buried target from the detector; and generate one or more measurements of the sample based on the one or more images.

In embodiments, the techniques described herein relate to a darkfield imaging system, where a respective one of the one or more illumination sources includes a bare light emitting diodes (LEDs), where a respective lens assembly of the two or more lens assemblies includes a field stop, where the homogenizer in the respective lens assembly provides the second spatial profile at the field stop; and a projection lens to image the field stop onto the buried target to provide a respective illumination beam of the two or more illumination beams.

In embodiments, the techniques described herein relate to a darkfield imaging system, where the homogenizer in the respective lens assembly includes a waveguide.

In embodiments, the techniques described herein relate to a darkfield imaging system, where the waveguide includes a sealing waveguide.

In embodiments, the techniques described herein relate to a darkfield imaging system, where the waveguide includes a multi-mode waveguide.

In embodiments, the techniques described herein relate to a darkfield imaging system, where the field stop includes an aperture.

In embodiments, the techniques described herein relate to a darkfield imaging system, where the field stop is located at an output face of the homogenizer.

In embodiments, the techniques described herein relate to a darkfield imaging system, where the field stop and the output face of the homogenizer are tilted to satisfy a Scheimpflug condition, where the projection lens images the field stop onto the buried target with an image plane that is coplanar with the buried target.

In embodiments, the techniques described herein relate to a darkfield imaging system, where the respective lens assembly further includes an aperture stop at a back focal plane of the projection lens, where the respective illumination beam is telecentric to provide uniform incidence angles across the common illumination field.

In embodiments, the techniques described herein relate to a darkfield imaging system, where the one or more illumination sources provide spatially coherent light, where the illumination sub-system includes two or more optical fibers to couple the spatially coherent light to the two or more lens assemblies.

In embodiments, the techniques described herein relate to a darkfield imaging system, where at least one of the one or more illumination sources includes a superluminescent diode.

In embodiments, the techniques described herein relate to a darkfield imaging system, where at least one of the two or more optical fibers is a multi-mode optical fiber.

In embodiments, the techniques described herein relate to a darkfield imaging system, where the multi-mode optical fiber has at least one of a rectangular, a square, or a hexagonal core.

In embodiments, the techniques described herein relate to a darkfield imaging system, where a respective lens assembly one of the two or more lens assemblies includes a collimator lens configured to collect light from an associated one of the two or more optical fibers; and two Powell lenses with apexes rotated 90 degrees with respect to each other.

In embodiments, the techniques described herein relate to a darkfield imaging system, where the respective lens assembly further includes an additional collimator lens after the two Powell lenses.

In embodiments, the techniques described herein relate to a darkfield imaging system, where the respective lens assembly further includes a field stop after the two Powell lenses.

In embodiments, the techniques described herein relate to a darkfield imaging system, where the one or more processors are further configured to execute program instructions causing the one or more processors to receive a dark reference image without the sample; receive a bright reference image of a plane of the sample at a depth of the buried target, where the buried target is outside a frame of the bright reference image; and generate a natural uniformity calibration (NUC) reference image based on the bright reference image and the dark reference image.

In embodiments, the techniques described herein relate to a darkfield imaging system, where generating the one or more measurements of the sample based on the one or more images includes subtracting the NUC reference image from the one or more images to form one or more calibrated images; and generating the one or more measurements based on the one or more calibrated images.

In embodiments, the techniques described herein relate to a darkfield imaging system, where the selected metric includes at least one of a standard deviation or a variance of intensity across the common illumination field.

In embodiments, the techniques described herein relate to a darkfield imaging system, where the one or more measurements include at least one of a metrology measurement, an inspection measurement, or an alignment measurement.

In embodiments, the techniques described herein relate to an illumination system including one or more illumination sources providing temporally incoherent light with a first spatial profile; and two or more lens assemblies configured to direct the light from the one or more illumination sources as two or more illumination beams to a buried target along optical paths outside an objective lens of an imaging sub-system, where the two or more illumination beams fully overlap at the buried target to provide a common illumination field, where the two or more lens assemblies limit numerical apertures of the two or more illumination beams to prevent specular reflection of the two or more illumination beams from entering the objective lens, where a respective one of the two or more lens assemblies includes a homogenizer to provide that a respective one of the two or more illumination beams has a second spatial profile with higher spatial uniformity than the first spatial profile according to a selected metric.

In embodiments, the techniques described herein relate to an illumination system, where the selected metric includes at least one of a standard deviation or a variance of intensity across the common illumination field.

In embodiments, the techniques described herein relate to a darkfield imaging method including illuminating, using an illumination sub-system, a buried target within a volume of a sample with two or more illumination beams, where the illumination sub-system, includes one or more illumination sources providing temporally incoherent light with a first spatial profile; and two or more lens assemblies configured to direct the light from the one or more illumination sources as two or more illumination beams to the buried target along optical paths outside an objective lens of an imaging sub-system including an objective lens and a detector, where the two or more illumination beams fully overlap at the buried target to provide a common illumination field, where the two or more lens assemblies limit numerical apertures of the two or more illumination beams to prevent specular reflection of the two or more illumination beams from entering the objective lens, where a respective one of the two or more lens assemblies includes a homogenizer to provide that a respective one of the two or more illumination beams has a second spatial profile with higher spatial uniformity than the first spatial profile according to a selected metric; generating one or more images of the buried target from the detector; and generating one or more measurements of the sample based on the one or more images.

In embodiments, the techniques described herein relate to a darkfield imaging method, further including generating a dark reference image without the sample; generating a bright reference image of a plane of the sample at a depth of the buried target, where the buried target is outside a frame of the bright reference image; and generating a natural uniformity calibration (NUC) reference image based on bright reference image and the dark reference image.

In embodiments, the techniques described herein relate to a darkfield imaging method, where generating the one or more measurements of the sample based on the one or more images includes subtracting the NUC reference image from the one or more images to form one or more calibrated images; and generating the one or more measurements based on the one or more calibrated images.

In embodiments, the techniques described herein relate to a darkfield imaging method, where the one or more measurements include at least one of a metrology measurement, an inspection measurement, or an alignment measurement.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
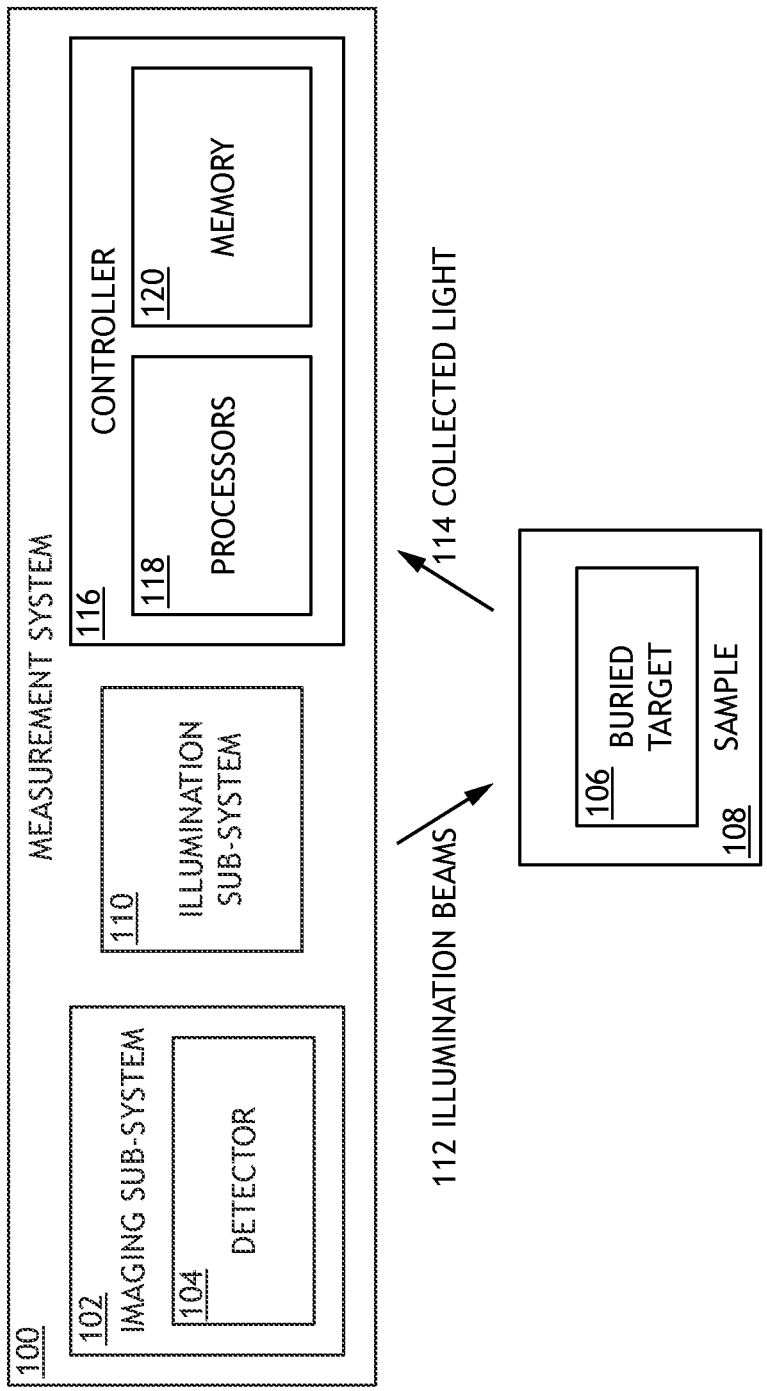
FIG. 1A is a conceptual view of a measurement system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing high-contrast imaging of buried features in a sample. It is contemplated herein that high-contrast imaging of buried features may be challenging due to specular reflections from a top surface of the sample and/or absorption of light by material above the features of interest (e.g., between the features of interest and an imaging apparatus).

In embodiments, a measurement tool includes an imaging apparatus configured to image buried features in a sample and an illumination apparatus providing multi-directional oblique illumination (e.g., annular illumination, quadrature illumination, dipole illumination, or the like) with a controlled angular profile tailored to prevent the collection of specular reflection by the imaging apparatus. In this way, high-contrast imaging of buried features may be achieved.

It is becoming increasingly desirable to image features within a volume of the sample under conditions where a top surface of the sample is polished and/or where the features of interest are buried beneath layers of absorbing material. As a non-limiting illustration, many modern semiconductor fabrication systems utilize bonded-sample technology in which multiple components (e.g., wafers and/or dies) are bonded together. For example, a sample may be formed from two bonded wafers (wafer-to-wafer (W2W)), two bonded dies (die-to-die (D2D)), or a die bonded to a wafer (D2W).

As an illustration, it is often desirable to image targets located at or near an interface between such bonded components. For example, bonded samples may include metrology targets such as, but not limited to, overlay targets to facilitate registration measurements between the bonded components. As another example, bonded samples may include alignment targets to facilitate spatial navigation across the samples (e.g., to facilitate precise navigation to metrology targets for measurements). In either case, such targets are typically buried beneath a substantial amount of semiconductor material (e.g., up to hundreds of micrometers in thickness) that is commonly doped and polished on one side. For instance, a top surface of a bonded sample may correspond to a back surface of a die or a wafer. Further, doped semiconductors typically absorb light used in imaging systems.

As a result, image contrast may be severely limited using typical imaging systems. For example, typical through the lens (TTL) brightfield imaging in which a common objective lens is used for both illumination and collection may suffer from low contrast due substantial specular reflection from a top surface of the sample that may overwhelm light from the buried features of interest. As another example, darkfield TTL imaging may avoid specular reflection, but may suffer from limited collection numerical aperture (NA) since much the NA is used by illumination beams and is thus unavailable for collection. As another example, outside the lens (OTL) illumination (e.g., in which different optics are used for illumination and collection) using typical LED illumination (e.g., a typical LED ring illuminator) may suffer from poor angular uniformity and/or some specular reflections, particularly when used with a non-telecentric imaging system.

It is contemplated herein that buried features may be imaged with high contrast using multi-directional outside the lens (OTL) illumination with an angular distribution selected to prevent the collection of specular reflection from the top surface of the sample. Further, a high image uniformity may be achieved when the illumination has a consistent angular distribution across an illumination field such that the relative contributions of illumination from different directions is consistent across the illumination field. In this way, the illumination density across an illumination field may be increased to improve contrast (e.g., by improving a signal to noise ratio associated with the features of interest) while avoiding negative impacts of specular reflection. A uniform angular distribution of light across an illumination field may also beneficially promote robust high-contrast imaging of buried features without artifacts even in the presence of slight process variations (e.g., variations of sample height during imaging and/or variations of sample properties due to variations in a fabrication process).

Referring now to FIGS. 1A-8, systems and methods providing high-contrast imaging of buried features in a sample based on multi-directional illumination with a consistent angular distribution of light across an illumination field are described in greater detail, in accordance with one or more embodiments of the present disclosure.

FIG. 1A is a conceptual view of a measurement system 100, in accordance with one or more embodiments of the present disclosure.

In embodiments, the measurement system 100 includes an imaging sub-system 102 with a detector 104 configured to image at least one buried target 106 within the volume of a sample 108, and further includes an illumination sub-system 110 configured to illuminate the buried target 106 with multiple illumination beams 112 having controlled angular distributions tailored to prevent specular reflections from entering the imaging sub-system 102. In this way, the measurement system 100 may provide dark-field images of the buried target 106 based on diffracted or scattered light from the buried target 106, which is referred to herein as collected light 114.

It is contemplated herein that image contrast of a buried target 106 may be achieved through tight control over the properties of the illumination beams 112 including, but not limited to, an illumination field size, an illumination field location, an illumination numerical aperture (NA), a spatial uniformity of all illumination beams 112 across the illumination field, and an angular uniformity of all illumination beams 112 across the illumination field.

In particular, tight control over the illumination NA enables illumination at angles that precludes capture of specular reflection by the imaging sub-system 102. Tight control over the illumination field size and location further provides high illumination density and efficient utilization of the light provided by the illumination sub-system 110. Accordingly, in embodiments, the illumination sub-system 110 may direct the illumination beams 112 to a common illumination field within the volume of the sample 108 to provide high illumination density.

It is further contemplated herein that uniform image contrast across an image may be achieved by providing multi-directional illumination with a consistent angular distribution along an illumination field such that a ratio of intensity from the various illumination beams 112 is constant across the illumination field. In particular, such a configuration provides a consistent response from the buried target 106 regardless of the orientation or design of the buried target 106. In embodiments, a consistent angular distribution across an illumination field is achieved by providing a uniform distribution of illumination from each illumination beam 112 across an illumination field.

In another embodiment, the measurement system 100 includes a controller 116 communicatively coupled to the measurement system 100. The controller 116 may be configured to direct the imaging sub-system 102 to generate dark-field images based on one or more selected recipes. The controller 116 may be further configured to receive data including, but not limited to, dark-field images from the imaging sub-system 102. Additionally, the controller 116 may be configured to determine overlay associated with an overlay target based on the acquired dark-field images.

In another embodiment, the controller 116 includes one or more processors 118. For example, the one or more processors 118 may be configured to execute a set of program instructions maintained in a memory 120, or memory device. The one or more processors 118 of a controller 116 may include any processing element known in the art. In this sense, the one or more processors 118 may include any microprocessor-type device configured to execute algorithms and/or instructions. Further, the memory 120 may include any storage medium known in the art suitable for storing program instructions executable by the associated one or more processors 118. For example, the memory 120 may include a non-transitory memory medium. As an additional example, the memory 120 may include, but is not limited to, a read-only memory, a random access memory, a magnetic or optical memory device (e.g., disk), a magnetic tape, a solid state drive and the like. It is further noted that memory 120 may be housed in a common controller housing with the one or more processors 118.

Figure 2A:
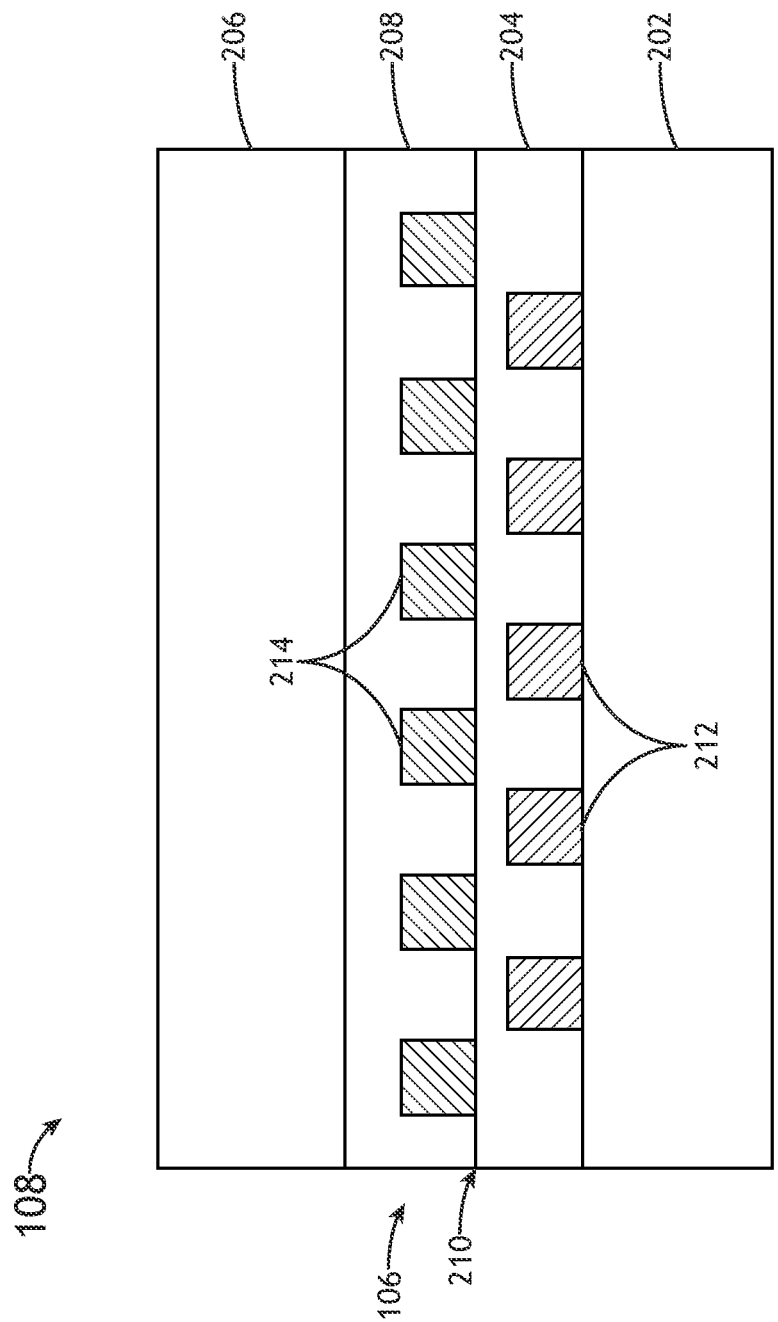
FIG. 2A is a side view of a bonded sample, in accordance with one or more embodiments of the present disclosure.
Figure 2B:
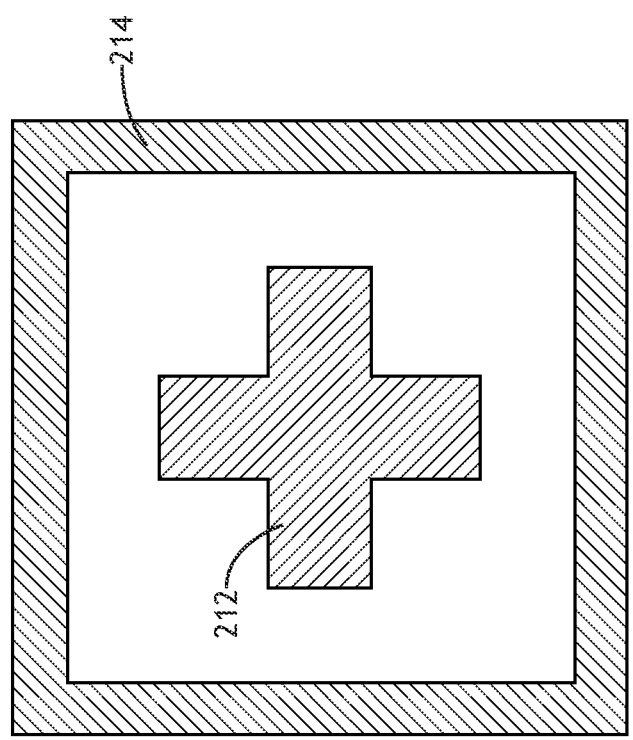
FIG. 2B is a top view of a first design of a buried target, in accordance with one or more embodiments of the present disclosure.
Figure 2C:
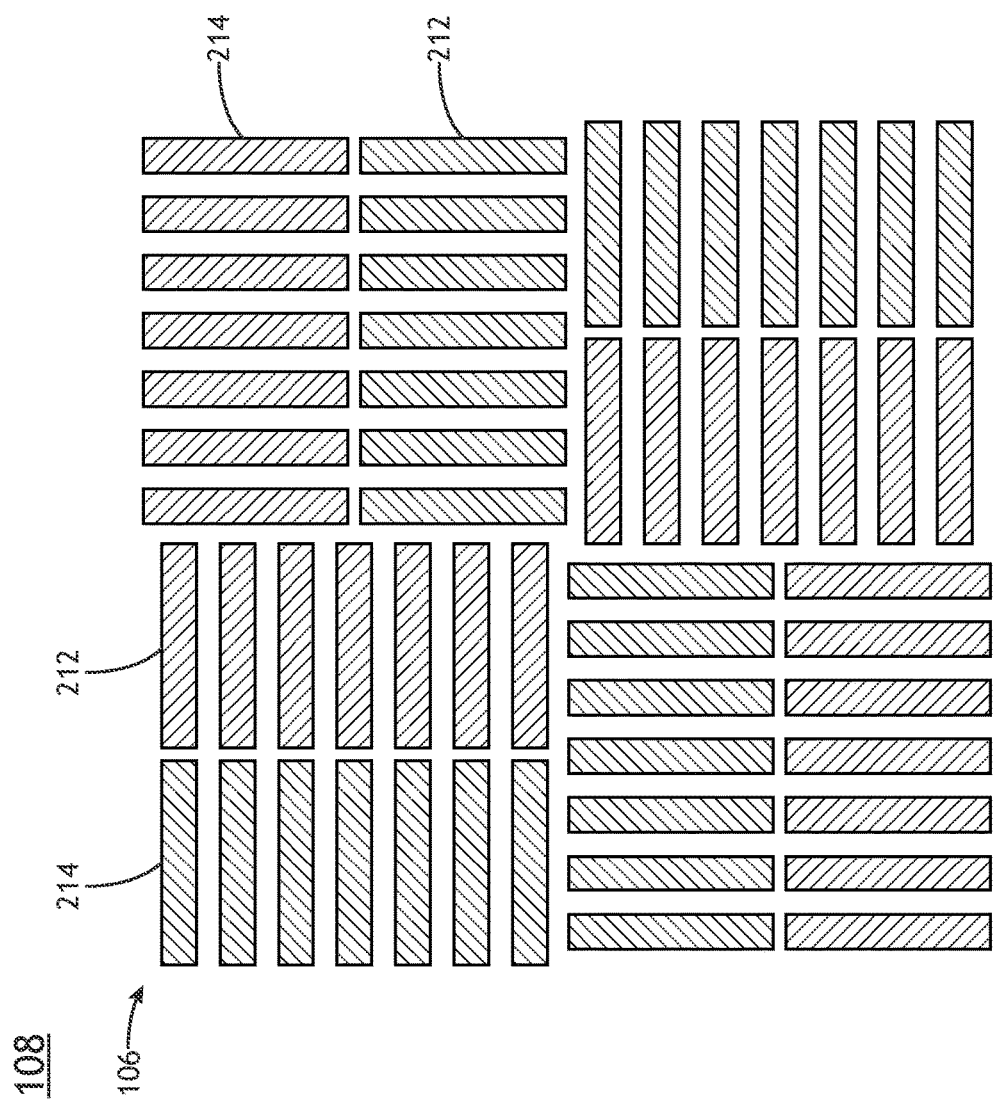
FIG. 2C is a top view of a second design of a buried target, in accordance with one or more embodiments of the present disclosure.

FIGS. 2A-2C depict various non-limiting examples of a buried target 106 suitable for being imaged by the measurement system 100.

The sample 108 may include any type of object or material including a buried target 106. In some embodiments, the sample 108 includes one or more substrates formed of a semiconductor or non-semiconductor material (e.g., a wafer, or the like). For example, a semiconductor or non-semiconductor material may include, but is not limited to, monocrystalline silicon, gallium arsenide, and indium phosphide. The sample 108 may include one or more layers. For example, such layers may include, but are not limited to, a resist, a dielectric material, a conductive material, and a semiconductive material. Many different types of such layers are known in the art, and the term sample 108 as used herein is intended to encompass an object on which all types of such layers may be formed. One or more layers formed on a sample 108 may be patterned or unpatterned. For example, a sample 108 may include a plurality of dies, each having repeatable patterned features. Formation and processing of such layers of material may ultimately result in completed devices. Many different types of devices may be formed on a sample 108, and the term sample 108 as used herein is intended to encompass any object on which any type of device known in the art is being fabricated.

The buried target 106 may be located at any depth in the sample 108. In some embodiments, the buried target 106 is located beneath one or more sample layers disposed on a substrate. In some embodiments, the sample 108 is a bonded sample formed from two or more bonded substrates. In this configuration, the buried target 106 may include features on layers associated with either of the substrates.

FIG. 2A is a side view of a bonded sample 108, in accordance with one or more embodiments of the present disclosure. In particular, FIG. 2A depicts a first substrate 202 with one or more first-substrate layers 204 and a second substrate 206 with one or more second-substrate layers 208, along with an interface 210 between bonded portions. FIG. 2A further depicts patterned first-substrate features 212 in the first-substrate layers 204 and second-substrate features 214 in the second-substrate layers 208. The bonded sample 108 in FIG. 2A may generally correspond to a W2W sample 108, a D2D sample 108, or a D2W sample 108. However, it is to be understood that FIG. 2A is provided solely for illustrative purposes and should not be interpreted as limiting. Rather, a buried target 106 may include any number of features on any layer of a sample 108 or at any location within the volume of the sample 108 more generally. Further, a sample 108 may include any number of intermediate layers between any of the first-substrate features 212 and the second-substrate features 214 and/or between such features and the respective substrates.

In some embodiments, a buried target 106 includes device features (e.g., patterned features that may be part of a device when fully formed). In some embodiments, a buried target 106 includes dedicated features designed to be imaged by the measurement system 100 for a particular purpose. For example, a buried target 106 may include features that form an alignment target, which may be suitable for calibrating sample coordinates to chuck coordinates after bonding, for aligning the first substrate 202 and the second substrate 206 prior to bonding, or for any other suitable purpose. As another example, a buried target 106 may include features that form an overlay target, which may be suitable for registration measurements between the first-substrate features 212 and the second-substrate features 214. For instance, an overlay target may be used to determine registration errors between bonded substrates. Using FIG. 2A as an illustration, registration measurements (e.g., overlay measurements between the first-substrate features 212 on the first-substrate layers 204 and the second-substrate features 214 on the second-substrate layers 208 may be used to evaluate a bonding process. In another instance, an overlay target may be used to determine registration errors between features on different first-substrate layers 204 and/or between features on different second-substrate layers 208.

FIGS. 2B-2C provide non-limiting illustrations of designs of a buried target 106, in accordance with one or more embodiments of the present disclosure.

FIG. 2B is a top view of a first design of a buried target 106, in accordance with one or more embodiments of the present disclosure. In FIG. 2B, the first-substrate features 212 include a cross feature and the second-substrate features 214 include a box feature. Such a design may be particularly well suited for, but is not limited to, use as an alignment target.

FIG. 2C is a top view of a second design of a buried target 106, in accordance with one or more embodiments of the present disclosure. In FIG. 2B, the first-substrate features 212 and the second-substrate features 214 each include periodic features. It is noted that although the first-substrate features 212 and the second-substrate features 214 are depicted in FIG. 2C as having different periods, this is merely illustrative and not limiting. Additionally, the numbers and orientations of any of the features are also merely illustrative and not limiting. Such a design may be particularly well suited for, but is not limited to, use as an overlay target. Further, the design illustrated in FIG. 2C may be characterized as an advanced imaging metrology (AIM) target.

Referring now to FIGS. 1B and 3-5, imaging with highly-controlled illumination beams 112 is described in greater detail, in accordance with one or more embodiments of the present disclosure.

Figure 1B:
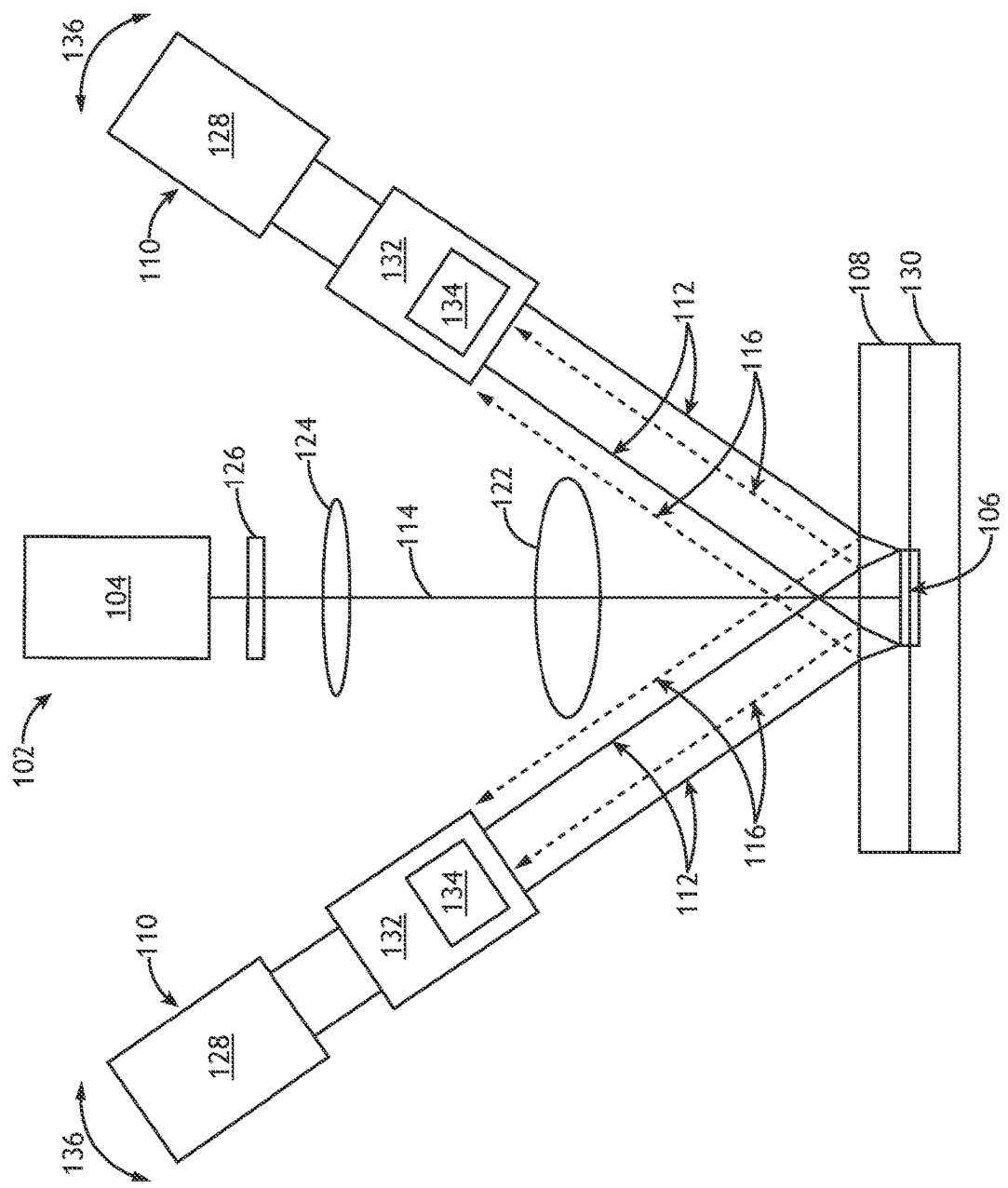
FIG. 1B is a simplified schematic of the measurement system, in accordance with one or more embodiments of the present disclosure.

FIG. 1B is a simplified schematic of the measurement system 100, in accordance with one or more embodiments of the present disclosure.

In embodiments, the imaging sub-system 102 includes various components configured to generate an image (e.g., a dark-field image) of a buried target 106 on a detector 104. For example, the imaging sub-system 102 may include an objective lens 122 to collect collected light 114. The imaging sub-system 102 may further include one or more imaging lenses 124 to manipulate the collected light 114 and provide the image of the buried target 106 on the detector 104. As an illustration, though not explicitly shown, the imaging lenses 124 may relay one or more field planes and/or pupil planes. The imaging sub-system 102 may further include one or more imaging optical components 126 to manipulate the collected light 114 such as, but not limited to, one or more filters, one or more polarizers, one or more beam blocks, or one or more beamsplitters. The imaging optical components 126 may be located at any suitable locations including, but not limited to, field and/or pupil planes. Together, the imaging lenses 124 and the imaging optical components 126 may manipulate the collected light 114 to provide a desired dark-field image of the buried target 106.

The illumination sub-system 110 may include any number or type of illumination sources 128 to generate light associated with one or more illumination beams 112. In embodiments, an illumination source 128 includes one or more LEDs, which may provide light that is temporally and spatially incoherent. In embodiments, an illumination source 128 includes a superluminescent diode (SLD), which may provide light that is temporally incoherent but spatially coherent. In embodiments, the illumination source 128 includes a laser-sustained plasma (LSP) source. For example, the illumination source 128 may include, but is not limited to, a LSP lamp, a LSP bulb, or a LSP chamber suitable for containing one or more elements that, when excited by a laser source into a plasma state, may emit broadband illumination. In embodiments, the illumination source 128 includes a lamp source. For example, the illumination source 128 may include, but is not limited to, an arc lamp, a discharge lamp, an electrode-less lamp, or the like.

The illumination beams 112 may include any desired spectral content. For example, the illumination beams 112 may include wavelengths in any spectral range such as, but not limited to, an ultraviolet spectral range, a visible spectral range, an infrared (IR) spectral range, a short-wave infrared (SWIR) spectral range, a near-IR spectral range, a mid-IR spectral range, or a far-IR spectral range. Further, the illumination beams 112 may have any bandwidth. In this way, the illumination beams 112 may be characterized as white light, broadband light, supercontinuum light, or narrowband light.

In some embodiments, the illumination beams 112 provided by the illumination sub-system 110 are temporally and/or spatially incoherent, which may avoid undesirable speckle patterns in generated images. It is recognized herein that the coherence of light may be characterized by characteristics temporal or spatial scale, beyond which interference is typically considered negligible. In this way, the term incoherent light may include have a characteristics temporal and/or spatial scale selected to prevent interference (at least within selected tolerances) on the sample 108 and/or a detector 104.

In embodiments, the measurement system 100 includes a translation stage 130 to secure and position a buried target 106 relative to the illumination sub-system 110 and/or the imaging sub-system 102. The translation stage 130 may include any number or type of actuators including, but not limited to, linear actuators (e.g., three-axis linear actuators), rotational actuators, or tip/tilt actuators.

In embodiments, the illumination sub-system 110 includes two or more lens assemblies 132 to form the two or more illumination beams 112 and direct the two or more illumination beams 112 to a common illumination field. Put another way, the lens assemblies 132 may provide that the illumination beams 112 fully overlap at a location of the buried target 106 within the volume of the sample 108.

In embodiments, each of the lens assemblies 132 include a homogenizer 134 to homogenize a spatial distribution a corresponding illumination beam 112. For example, a homogenizer 134 may receive light from an illumination source 128 having a first spatial distribution and manipulate this light to provide an illumination beam 112 with a second spatial distribution different than the first spatial distribution, where the second spatial distribution has a higher spatial uniformity than the first spatial distribution according to a selected metric. Any suitable metric may be utilized including, but not limited to, a standard deviation, a variation, or the like.

In embodiments, the imaging sub-system 102 provides two or more illumination beams 112 with common polar incidence angles (e.g., as measured from a surface normal of the sample 108 but different azimuth incidence angles. For example, the illumination sub-system 110 may provide illumination beams 112 with a dipole distribution, a quadrupole distribution, or a ring distribution with any number of illumination beams 112. As an illustration, FIG. 1B depicts two illumination sources 128 providing symmetric illumination beams 112 at opposing azimuth incidence angles and common polar incidence angles, though this is not limiting on the number or orientation of illumination beams 112.

Further, each of the lens assemblies 132 may limit a numerical aperture of a corresponding illumination beam 112. For example, each of the lens assemblies 132 may limit a numerical aperture of a corresponding illumination beam 112 such that specular reflection of the corresponding illumination beam 112 does not enter the objective lens 122 of the imaging sub-system 102. In this way, specular reflection from a top surface of the sample 108 and/or from the buried target 106 may be prevented. In some embodiments, the lens assemblies 132 are configured together such that an angular illumination profile is constant across the illumination field within a selected tolerance (e.g., standard deviation, variance, or the like). For example, the lens assemblies 132 may provide that a relative contribution of light as a function of angle is uniform across the illumination field. Put another way, for each location in the illumination field, a ratio of intensities of the two or more illumination beams 112 is constant. It is contemplated herein that such a uniform angular distribution of light across the illumination field may mitigate hazing or angle-induced variations in an image of the buried target 106 generated by the imaging sub-system 102.

Figure 3:
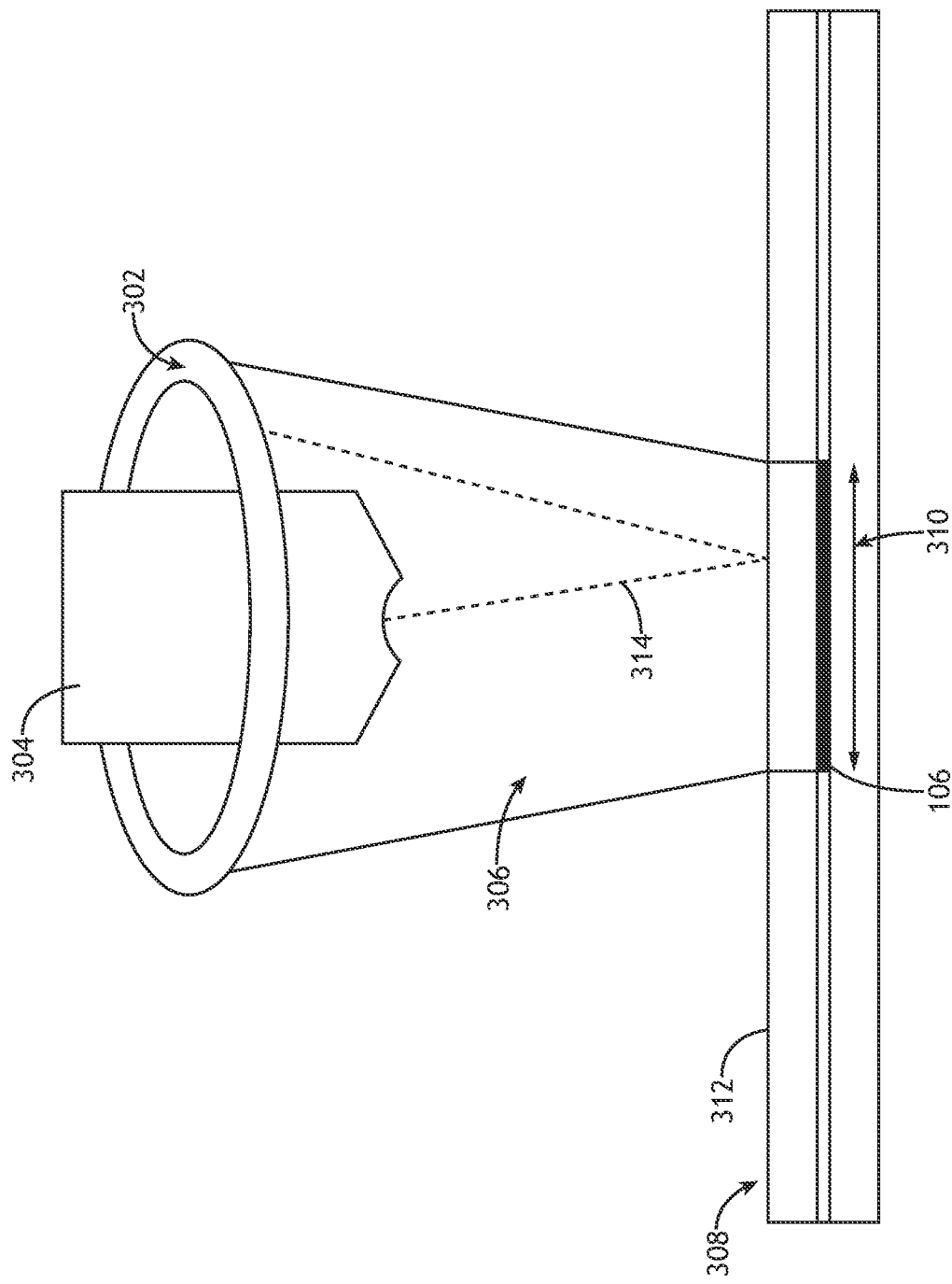
FIG. 3 is a simplified schematic of traditional ring illumination, in accordance with one or more embodiments of the present disclosure.
Figure 4A:
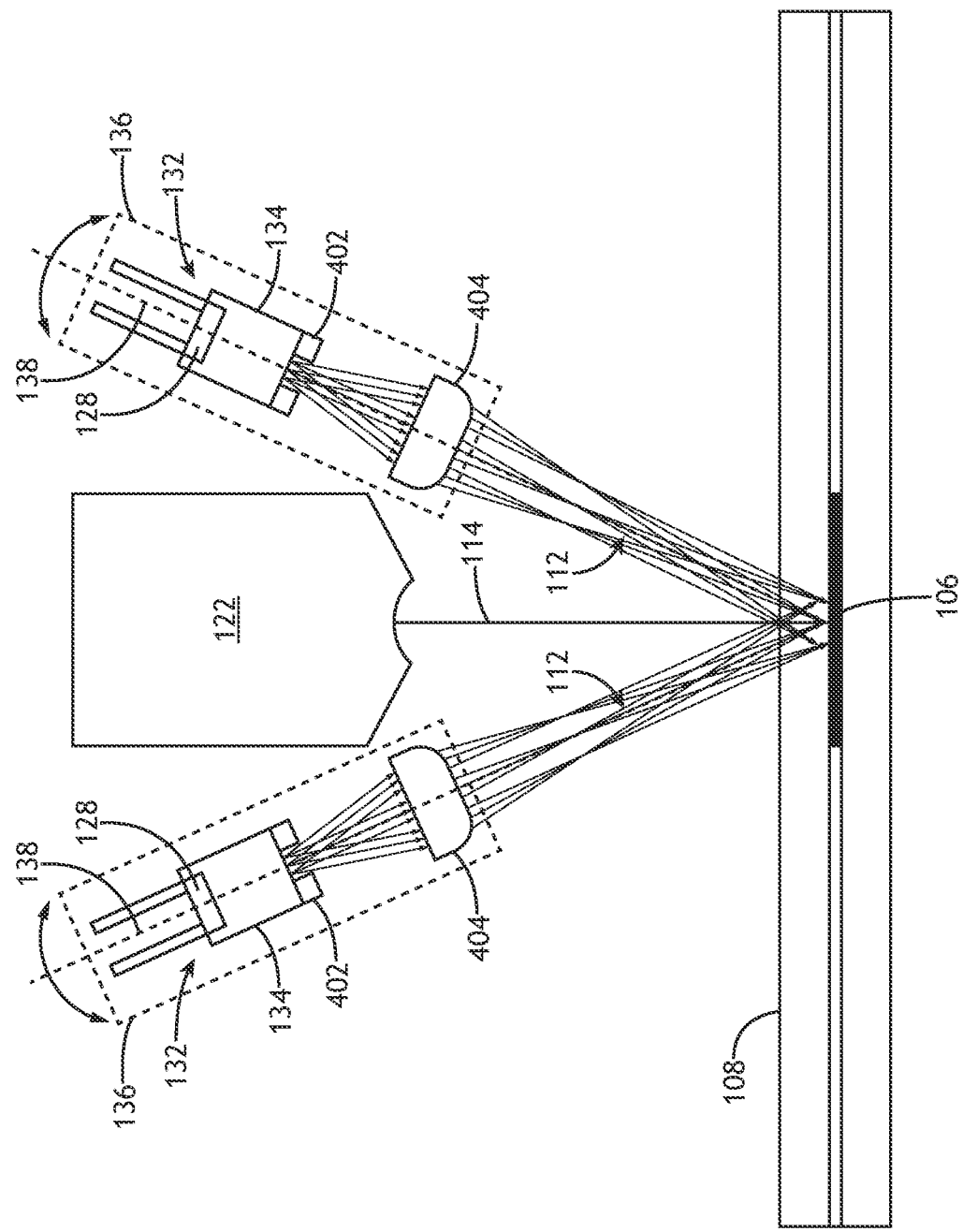
FIG. 4A is a conceptual view of a first design of an illumination sub-system, in accordance with one or more embodiments of the present disclosure.
Figure 4B:
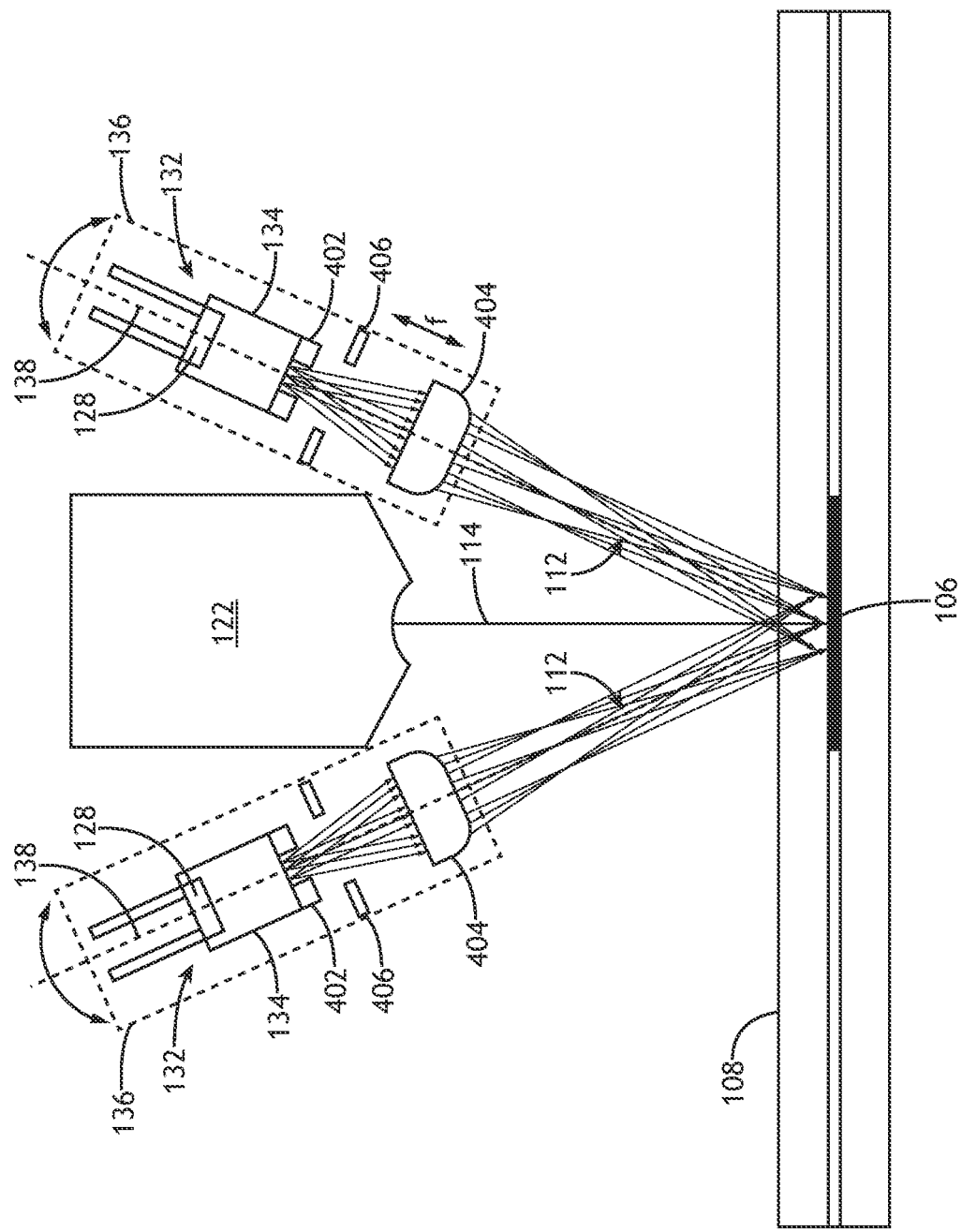
FIG. 4B is a conceptual view of a second design of an illumination sub-system, in accordance with one or more embodiments of the present disclosure.
Figure 4C:
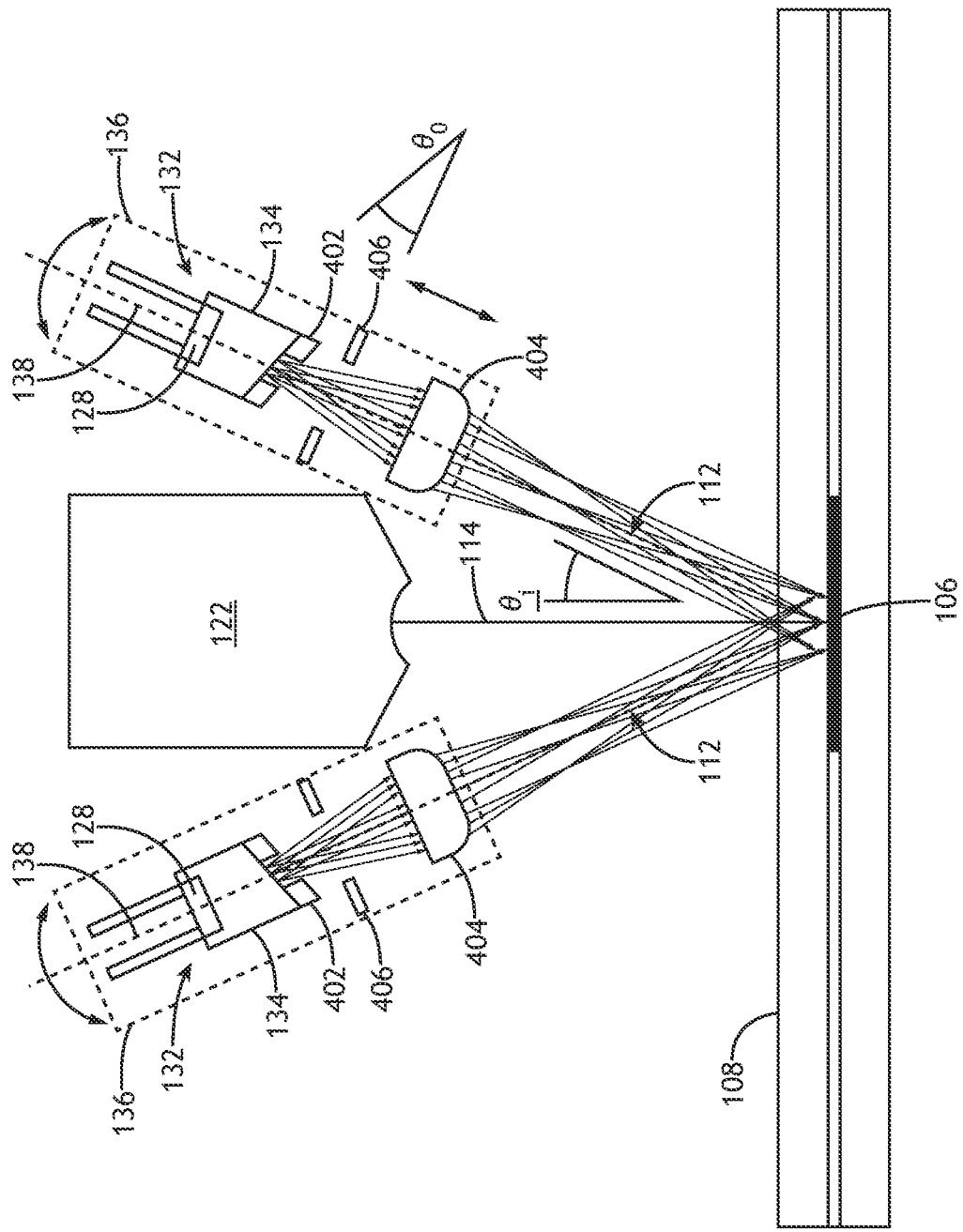
FIG. 4C is a conceptual view of a third design of an illumination sub-system, in accordance with one or more embodiments of the present disclosure.
Figure 5:
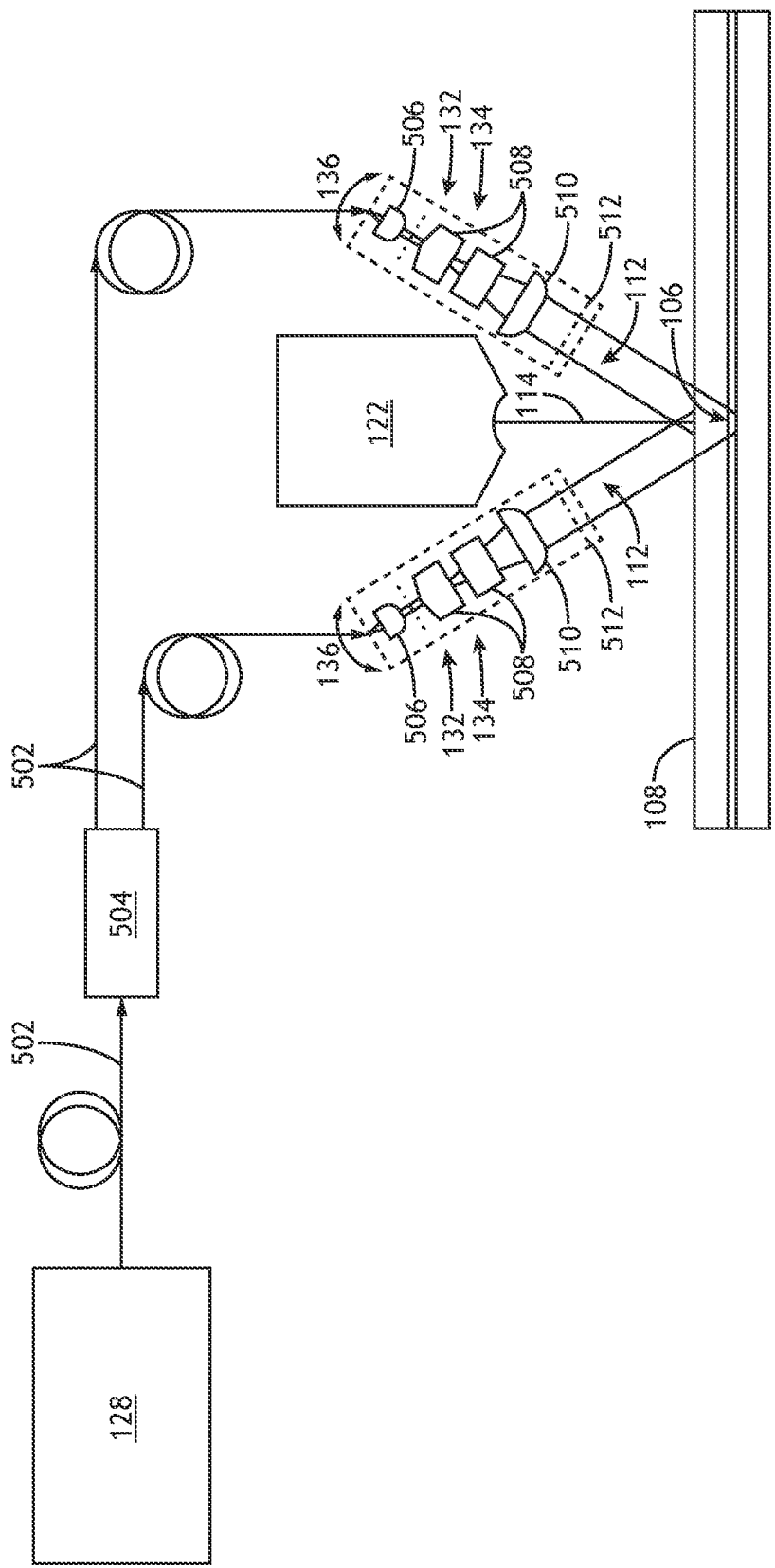
FIG. 5 is a conceptual view of a fourth design of an illumination sub-system, in accordance with one or more embodiments of the present disclosure.

FIGS. 3-5 depict various dark-field imaging configurations, in accordance with one or more embodiments of the present disclosure.

Dark-field imaging relies on light deviated by features of interest through mechanisms such as, but not limited to, scattering or diffraction. In an ideal dark-field imaging system, contrast may generally be improved by increasing the illumination intensity or fluence across an illumination field. For example, illumination intensity or fluence across an illumination field and thus image contrast may be increased by increasing the output power of the illumination beams 112, reducing a size of an illumination field for given power levels, and/or ensuring high overlap between illumination fields of the various illumination beams 112. It may further be desirable in some applications to provide illumination with a consistent angular distribution across an illumination field, where relative contributions of the various illumination beams 112 is consistent across the illumination field. Such a configuration may beneficially avoid image non-uniformities between features of a buried target 106 with different orientations.

However, practical systems may suffer from undesired signals that may reduce the image contrast and/or introduce image non-uniformities. As an illustration, FIG. 3 is a simplified schematic of traditional ring illumination, in accordance with one or more embodiments of the present disclosure. In FIG. 3, a ring of LEDs 302 is placed around an objective lens 304 and projects light 306 to a sample 308. As depicted in FIG. 3, a typical LED illuminator may provide highly divergent light 306 with a relatively large angular distribution, which may result in a relatively large illumination field 310 on the sample 308. However, such a configuration may result in the collection of some specular reflection from a top surface 312 of the sample 108. For example, FIG. 3 depicts a ray 314 of the light 306 associated with specular reflection from the top surface 312 of the sample 308 that is collected by the objective lens 304, which may negatively impact image contrast of buried features, particularly when using a non-telecentric imaging configuration.

Although not explicitly shown in FIG. 3, a typical LED 302 within a typical ring illuminator may also provide a highly non-uniform intensity of light 306 across the sample 308 (e.g., a non-uniform illumination field). For example, the light from a typical LED 302 may have a Gaussian profile on the sample 308. In some cases, a typical ring illuminator may attempt to mitigate such field non-uniformity from individual LEDs 302 by arranging the illumination fields of each LED 302 to only partially overlap in a pattern that provides relatively uniform total intensity over at least a portion of the sample 308. However, such a configuration may be undesirable for certain applications such as, but not limited to, alignment or metrology. In particular, poor angular uniformity of illumination across a sample 308 (e.g., variations of relative intensity from individual LEDs 302 at different angles) may result in spatially-varying image contrast variations for features having different orientations.

FIGS. 4A-5 depict non-limiting examples of an illumination sub-system 110 suitable for high-contrast imaging of a buried target 106, in accordance with one or more embodiments of the present disclosure. In particular, FIGS. 4A-4C depict configurations incorporating bare LED illumination sources 128 with lens assemblies 132 arranged to provide illumination beams 112 with high spatial and angular uniformity, while FIG. 5 depicts a configuration incorporating a SLD delivered by optical fibers and lens assemblies 132 arranged to provide collimated illumination beams 112.

FIG. 4A is a conceptual view of a first design of an illumination sub-system 110, in accordance with one or more embodiments of the present disclosure.

In embodiments, the measurement system 100 includes two or more illumination sources 128 configured as bare LEDs coupled to a homogenizer 134 and a field stop 402 formed as an aperture. In this configuration, the homogenizer 134 in a lens assembly 132 provides a spatially uniform distribution of light in the aperture of a field stop 402 in the lens assembly 132. More specifically, the homogenizer 134 may receive a first spatial distribution of light and provide a second spatial distribution of light at the aperture of the field stop 402 that is more uniform than the first spatial distribution (e.g., based on a standard deviation metric, a variance metric, or any other suitable metric). A lens assembly 132 may then include a projection lens 404 configured to project (e.g., image) light from the field stop 402 to a plane of the buried target 106 within the volume of the sample 108. It is contemplated herein that such a configuration may limit the angular distribution of light within each illumination beam 112 (e.g., create a controlled angular profile), which may be tailored to prevent specular reflection from entering the imaging sub-system 102 and promote high-contrast imaging more generally.

Each homogenizer 134 may include any component or combination of components suitable for homogenizing the spatial distribution of light from a corresponding illumination source 128. In some embodiments, as depicted in FIG. 4A, a homogenizer 134 includes a sealing waveguide. For example, a homogenizer 134 may include a glass structure (e.g., a glass cap) configured to contain light from an illumination source 128 and direct this light to the top surface 312. Further, such a sealing waveguide may include one or more coatings on input and/or output faces to provide a desired level of power efficiency. In some embodiments, a homogenizer 134 includes a multi-mode optical fiber. Such a multi-mode optical fiber may have any core shape. For example, a multi-mode optical fiber may have a square shape, a rectangular shape, a hexagonal shape, or the like configured to promote spatial homogenization of the guided light. In some embodiments, the homogenizer 134 is provided by placing the field stop 402 at a selected distance from an illumination source 128. It is contemplated herein that such a configuration may provide some spatial homogenization of light from the illumination source 128, but at the expense of some loss of light. However, in some applications, such a loss may be acceptable.

The field stop 402 may have any size or configuration. In a general sense, a size of the field stop 402 (e.g., an size of an open aperture forming the field stop 402) may control a size of the illumination field. Accordingly, the field stops 402 associated with different lens assemblies 132 may all have a common size to provide that the corresponding illumination beams 112 all have a common illumination field.

In embodiments, the field stop 402 is located on an output end of the homogenizer 134. For example, FIG. 4A depicts a configuration in which the field stop 402 is located on an output end of a sealing waveguide homogenizer 134. Similarly, a field stop 402 may be located at an output end of a homogenizer 134 formed as a multi-mode fiber.

The projection lens 404 may include one or more lenses (e.g., a single lens or a compound lens assembly) or other focusing elements suitable for projecting (e.g., imaging) the field stop 402 to a plane of the buried target 106 within the volume of the sample 108 as an illumination beam 112. In this way, a distribution of light associated with an illumination beam 112 at the illumination field (e.g., at a plane of the buried target 106) may correspond to a distribution of light at the field stop 402.

In embodiments, a lens assembly 132 includes an aperture stop 406 to control a numerical aperture (e.g., a range of incidence angles) of an associated illumination beam 112. For example, an aperture stop 406 may be formed as an aperture, where a size of the aperture controls a numerical aperture of the illumination beam 112. In some applications, the opening size of the aperture stop 406 may be selectively controlled to minimize specular reflections and/or undesirable scattering from entering the objective lens 122 of the imaging sub-system 102 in order to promote high-contrast imaging.

In some embodiments, the incidence angle of an illumination beam 112 is adjustable. For example, the illumination sub-system 110 may include an angle-control stage 136 to position a lens assembly 132, or a portion thereof. Such an angle-control stage 136 may include a rotational actuator, a tip/tilt actuator, a linear actuator, or any combination thereof. As an illustration, FIG. 4A depicts an angle-control stage 136 associated with each illumination source 128 and associated lens assembly 132.

FIG. 4B is a conceptual view of a second design of an illumination sub-system 110, in accordance with one or more embodiments of the present disclosure. FIG. 4B is substantially similar to FIG. 4A, except that the aperture stop 406 is placed at a back focal plane of the projection lens 404 (e.g., at a distance of f from the projection lens 404, where f is the focal length). Such a configuration provides telecentric illumination, where an associated illumination beam 112 illuminates all points of the illumination field at the same incidence angle (e.g., the same obliquity).

FIG. 4C is a conceptual view of a third design of an illumination sub-system 110, in accordance with one or more embodiments of the present disclosure. FIG. 4B is substantially similar to FIG. 4B, except that the field stop 402 is tilted according to a Scheimpflug condition to provide a correspondingly tilted illumination field.

For example, the configurations of the illumination sub-system 110 depicted in FIGS. 4A and 4B provide that the field stop 402 and the projection lens 404 are both oriented normal to an optical axis 138. In these configurations, the distribution of light at the field stop 402 is projected by the projection lens 404 to an image plane in the sample 108 that is also normal to the optical axis 138. However, since the optical axis 138 is tilted with respect to the buried target 106, the image of the field stop 402 may not be in focus across the entire illumination field (e.g., across the buried target 106). As a result, the distribution of light across the buried target 106 may exhibit non-uniformities, where the extent of the non-uniformities may depend on factors such as, but not limited to, the depth of field provided by the projection lens 404 or the tilt angle of the optical axis 138 relative to the buried target 106 (e.g., relative to a surface normal of the sample 108).

In contrast, FIG. 4C depicts a configuration in which image plane provided by the projection lens 404 is tilted to be coplanar with the buried target 106. As a result, the image of the field stop 402 may be in focus across the entire illumination field (e.g., across the buried target 106).

Notably, when the field stop 402 is imaged onto the buried target 106 with an obliquity $\theta_i$ and a magnification M, the Scheimpflug condition is met when the tilt angle $\theta_o$ of the field stop 402 satisfied:

$$\tan \theta_0 = \frac{\tan \theta_i}{M}. \quad (1)$$

Referring now to FIG. 5, in some embodiments, the illumination sub-system 110 provides collimated illumination beams 112. For example, an illumination source 128 providing spatially coherent (but perhaps temporally incoherent) light may be collimated to provide an illumination beam 112 extremely high spatial and angular uniformity. Any suitable spatially coherent illumination source 128 may be utilized including, but not limited to, a SLD.

FIG. 5 is a conceptual view of a fourth design of an illumination sub-system 110, in accordance with one or more embodiments of the present disclosure.

In FIG. 5, a SLD high-power illumination source 128 is used with a driver and a heat controller to provide stable short wave infrared (SWIR) illumination beam 112. For example, the illumination beam 112 may have a center wavelength of approximately 1310 nm and a bandwidth of approximately 100 nm full-width half-maximum (FWHM). Further, the light from such an illumination source 128 may be delivered using optical fibers or free-space optics. As an illustration, FIG. 5 depicts a configuration in which a single SLD illumination source 128 is coupled to an optical fiber 502, where one or more splitters 504 separate the light into multiple paths associated with a desired number of illumination beams 112. Any type of optical fiber 502 may be used including, but not limited to, a multi-mode or a single-mode optical fiber 502. As another illustration, though not shown, an illumination sub-system 110 may include a separate illumination source 128 for each illumination beam 112.

In embodiments, a lens assembly 132 operates as both a homogenizer 134 and a collimator to provide an illumination beam 112 with high spatial and angular uniformity. For example, FIG. 5 depicts a configuration in which each lens assembly 132 includes a collimator lens 506 (e.g., a fiber collimator) to collimate the light from the optical fiber 502 followed by a homogenizer 134 formed from two Powell lenses 508 with apexes rotated 90 degrees relative to each other. It is contemplated herein that the spatial profile of light exiting the optical fiber 502 may depend on the mode profile of the guided light. In some fiber designs, the spatial profile may be Gaussian. Accordingly, the homogenizer 134 (here, depicted as Powell lenses) may increase the spatial uniformity of the collimated light. FIG. 5 further depicts an additional lens 510 to ensure collimation after the homogenizer 134 and a field stop 512 to control a diameter of the illumination beam 112 and thus a spot size on the buried target 106. It is contemplated herein that such a configuration may provide exceptionally high spatial and angular non-uniformity to promote high-contrast imaging of a buried target 106 as disclosed herein.

However, it is to be understood that FIGS. 4A-5 are provided solely for illustrative purposes and should not be interpreted as limiting the scope of the present disclosure. For example, an illumination sub-system 110 may generate any number of illumination beams 112 at any arrangement of altitude or azimuth incidence angles. In this way, the depictions of two illumination beams 112 in FIGS. 4A-5 are merely illustrative. As another example, the components of the lens assemblies 132 such as, but not limited to, the homogenizer 134 depicted in FIGS. 4A-5 are also merely illustrative. Any number or type of components may be utilized to provide illumination beams 112 with spatial and angular uniformity that meet or exceed selected metrics (e.g., standard deviation metrics, variance, metrics, or the like).

Figure 6:
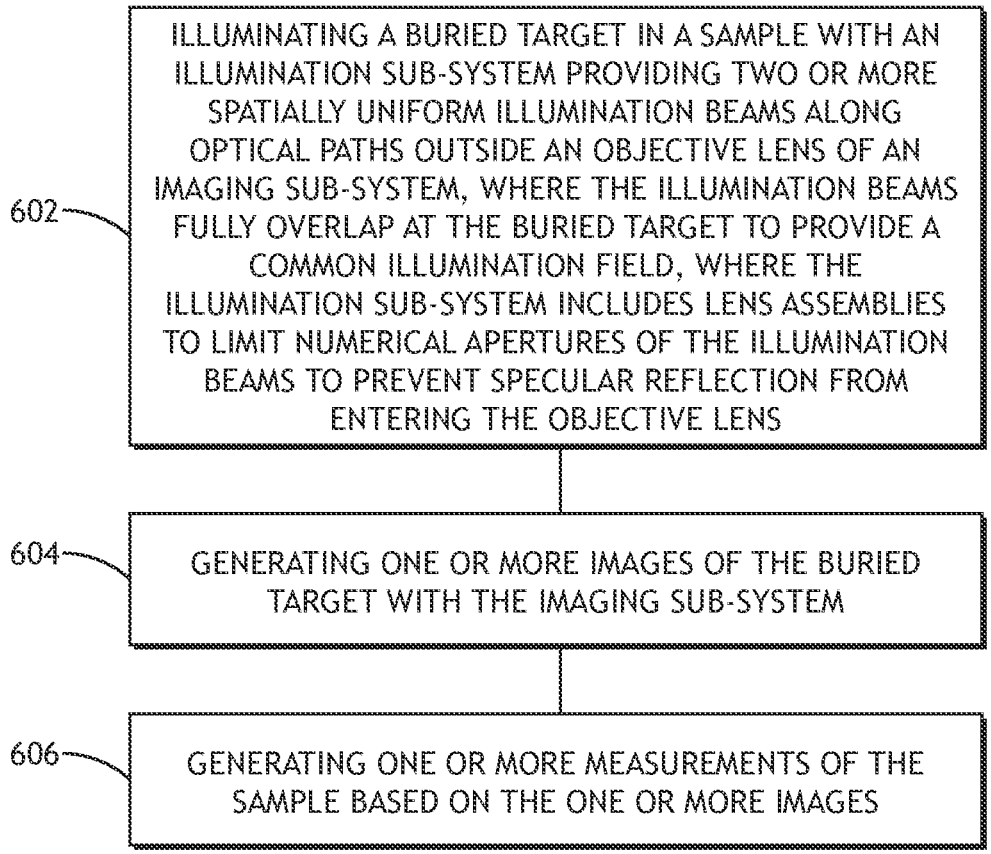
FIG. 6 is a flow diagram illustrating steps performed in a method 600 for imaging a buried target 106, in accordance with one or more embodiments of the present disclosure.

Referring now to FIG. 6, FIG. 6 is a flow diagram illustrating steps performed in a method 600 for imaging a buried target 106, in accordance with one or more embodiments of the present disclosure. The embodiments and enabling technologies described previously herein in the context of the measurement system 100 should be interpreted to extend to the method 600. For example, the processors 118 of the controller 116 may execute program instructions causing the processors 118 to implement any or all of the steps of the method 600 directly or indirectly (e.g., via control signals to additional components of the measurement system 100). However, that the method 600 is not limited to the architecture of the measurement system 100.

In embodiments, the method 600 includes a step 602 of illuminating a buried target 106 with an illumination sub-system 110 providing two or more spatially-uniform illumination beams 112 along optical paths outside an objective lens 122 of an imaging sub-system 102, where the illumination beams 112 fully overlap at the buried target 106 to provide a common illumination field, where illumination sub-system 110 includes lens assemblies 132 to limit numerical apertures of the illumination beams 112 to prevent specular reflection from entering the objective lens. In embodiments, the method 600 includes a step 604 of generating one or more images of the buried target 106 with the imaging sub-system 102. In embodiments, the method 600 includes a step 606 of generating one or more measurements of the sample 108 based on the one or more images.

For example, the steps 602 and 604 of the method 600 may be, but are not required to be, implemented with the illumination sub-system 110 and the imaging sub-system 102 of the measurement system 100 as described with respect to FIGS. 1A-5. In this way, the descriptions associated with FIGS. 1A-5 may be extended to apply to the method 600.

The measurements generated in step 606 may be any type of measurements. In some embodiments, the measurements include metrology measurements such as, but not limited to, overlay measurements or critical dimension (CD) measurements. In some embodiments, the measurements include inspection measurements such as, but not limited to, the identification and/or characterization of defects. In some embodiments, the measurements include alignment measurements. For example, in the case of a bonded sample 108, the buried target 106 may correspond to an alignment target at an interface of bonded components. In this configuration, measurements of the buried target 106 may be indicative of an accuracy of alignment between the bonded components before or after a bonding process.

The AMS of traditional metrology tools utilizes low NA bright field epi-illumination microscopy configuration. However, this configuration suffers from low contrast due to strong specular reflections as well as absorption by dopants as described previously herein. It is contemplated herein that the measurement system 100 may be used as an AMS to provide high-contrast imaging as described throughout the present disclosure. Similarly, the method 600 may be used for the purposes of AMS calibration of sample 108 and chuck coordinate systems (e.g., a coordinate system associated with a translation stage 130). In this way, the high-contrast images associated with the systems and methods disclosed herein may beneficially enable more accurate calibration than traditional systems.

In some embodiments, an image of the buried target 106 is calibrated to further improve contrast and/or visibility of the buried target 106.

Figure 7:
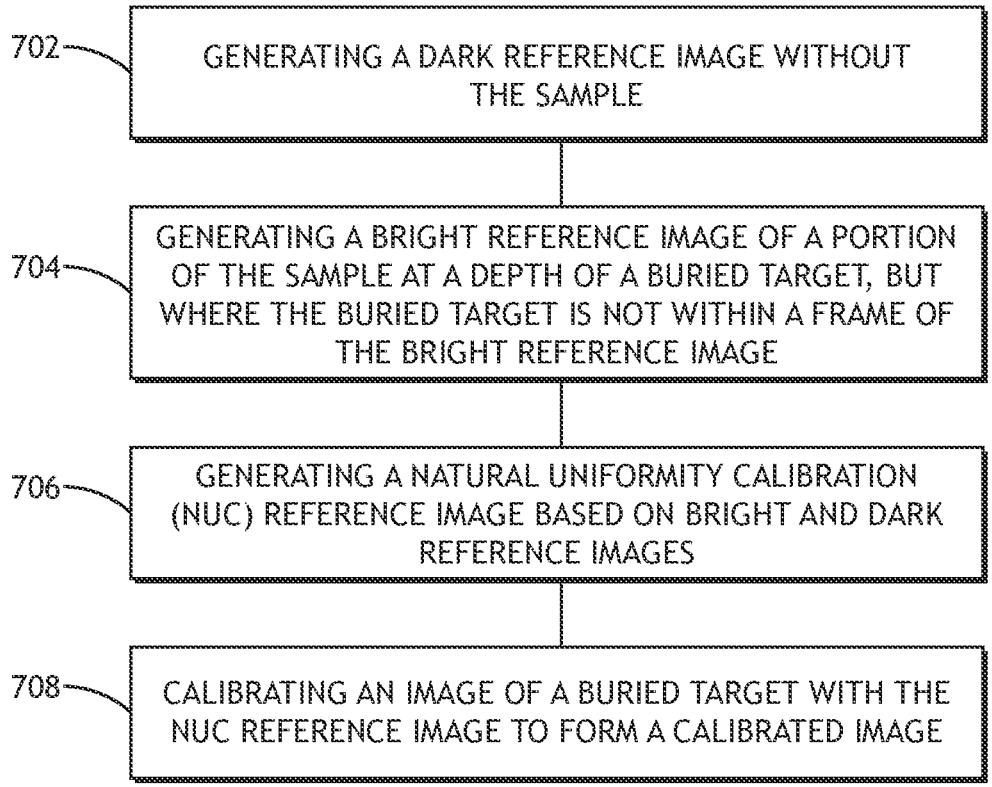
FIG. 7 is a flow diagram illustrating steps performed in a method for calibrating an image of a buried target, in accordance with one or more embodiments of the present disclosure.

FIG. 7 is a flow diagram illustrating steps performed in a method 700 for calibrating an image of a buried target 106, in accordance with one or more embodiments of the present disclosure. For example, FIG. 7 may depict a natural uniformity calibration (NUC) process. The embodiments and enabling technologies described previously herein in the context of the measurement system 100 should be interpreted to extend to the method 700. For example, the processors 118 of the controller 116 may execute program instructions causing the processors 118 to implement any or all of the steps of the method 700 directly or indirectly (e.g., via control signals to additional components of the measurement system 100). However, that the method 700 is not limited to the architecture of the measurement system 100.

In embodiments, the method 700 includes a step 702 of generating a dark reference image without the sample 108. For example, the sample 108 may be moved away from a measurement field of the imaging sub-system 102 such that no photons from sample 108 are captured by the objective lens 122.

In embodiments, the method 700 includes a step 704 of generating a bright reference image of a portion of the sample 108 at a depth of a buried target 106, but where the buried target 106 is not within a frame of the bright reference image. In this way, the bright reference image may correspond to a fixed parasitic pattern that may include scattering from the sample 108 or other parasitic signals.

In embodiments, the method 700 includes a step 706 of generating a NUC reference image based on bright and dark reference images. For example, the NUC reference image may be generated by subtracting the dark reference image from the bright reference image.

In embodiments, the method 700 includes a step 708 of calibrating an image of a buried target 106 with the NUC reference image to form a calibrated image. For example, the NUC reference image may be subtracted from an image of the buried target 106 (e.g., an image generated in step 604 of the method 600). In this way, contrast of the buried target 106 may be further improved. Further, such a calibrated image may be used to generate a measurement (e.g., an alignment measurement, a metrology measurement, an inspection measurement, or the like). As an illustration, the step 606 may include generating one or more measurements using the calibrated image of the buried target 106.

As an illustration, marks that form buried targets 106 may be printed between stacked wafers/dies in different locations of a bonded sample 108, both for overlay metrology and for spatial navigation across the wafers. In order to navigate between site to site at run time, an initial alignment process of the bonded sample 108 axes and the tool chuck axes may be carried out. An alignment measuring system (AMS) may then be used to image the buried targets 106 between the bonded components and further to calibrate the sample and chuck coordinate systems. After the calibration is completed, a user-provided map of the sample 108 may be used to navigate to desired locations on the sample 108.

For example, the method 600 may further include a step (not shown) of calibrating sample coordinates associated with one or more images of one or more buried targets 106 to chuck coordinates associated with a translation stage securing the sample 108. In some cases, multiple buried targets 106 may be visible within an image. In some cases, multiple buried targets 106 across a sample 108 are separately imaged.

In some embodiments, a buried target 106 is used as a high-resolution reference point (HRRP) in a high-resolution alignment process, which may be performed after an AMS calibration.

For example, buried targets 106 with common designs may be distributed across the sample 108 (e.g., distributed within different fields on the sample 108). Then, a measurement system 100 may translate the sample 108 to expected positions of these buried targets 106 (potentially after a first AMS calibration step as described above) and capture images of the buried targets 106 at these expected positions. Finally, a high-resolution calibration of the sample coordinates to the chuck coordinates may be generated based on deviations of the imaged positions of the buried targets 106 from the expected positions (e.g., deviations from centers of corresponding images).

Figure 8:
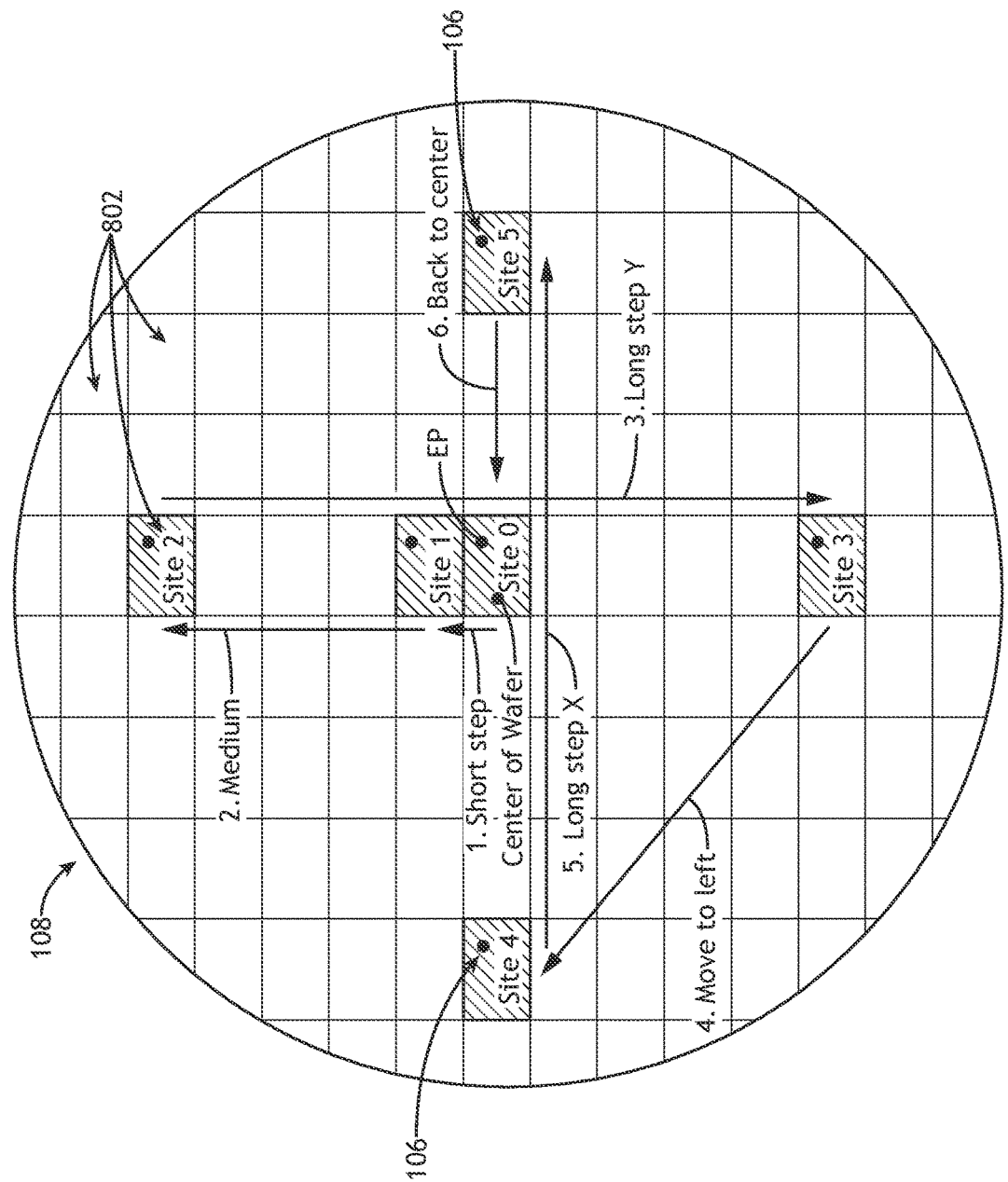
FIG. 8 is a simplified schematic of a sample depicting buried targets for use as high-resolution reference points in a high-resolution alignment process, in accordance with one or more embodiments of the present disclosure.

FIG. 8 is a simplified schematic of a sample 108 depicting buried targets 106 for use as high-resolution reference points in a high-resolution alignment process, in accordance with one or more embodiments of the present disclosure. In particular, FIG. 8 depicts a sample 108 with various fields 802 associated with exposure fields of view of a lithographic system. Further, buried targets 106 are distributed within selected fields 802, where the buried targets 106 are labeled as Site 0 through Site 5. In embodiments, a high-resolution alignment process may include generating images at expected locations of the buried targets 106 and noting deviations of the imaged locations of the buried targets 106 relative to expected locations (e.g., image centers). In this way, these deviations may be used to generate high-resolution calibrations for aligning sample coordinates to chuck coordinates. Further, as depicted in FIG. 8, the various fields 802 including the buried targets 106 may be intentionally distributed in a pattern suitable for capturing positioning errors associated with both large and small movements. For example, Step 1 may correspond to a relatively short step along a vertical direction, Step 2 may correspond to a medium step along the vertical direction, Step 3 may correspond to a long step along the vertical direction, step 4 may correspond to combined horizontal and vertical motion, Step 5 may correspond to a long step along the horizontal direction, and Step 6 may correspond to a medium step along the horizontal direction. It is to be understood that the pattern of the buried targets 106 is provided solely for illustrative purposes and should not be interpreted as limiting. Rather, buried targets 106 may be distributed in any suitable pattern.

In some cases, a measurement system 100 includes at two detectors 104 to perform both AMS and HRRP calibrations. For example, a first detector 104 with a first resolution may be used for the AMS calibration, whereas a second detector 104 with a second resolution higher than the first resolution may be used for the HRRP calibrations. Further, the buried targets 106 used for the AMS and HRRP calibrations may be the same or different. In some cases, a first measurement system 100 is configured to perform an AMS calibration, where a second measurement system 100 is configured to perform an HRRP calibration.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A darkfield imaging system comprising:
an imaging sub-system including an objective lens and a detector configured to image a buried target within a volume of a sample;
an illumination sub-system, comprising:
one or more illumination sources providing light with a first spatial profile; and
two or more lens assemblies configured to direct the light from the one or more illumination sources as two or more illumination beams to the buried target along optical paths outside the objective lens, wherein the two or more illumination beams fully overlap at the buried target to provide a common illumination field, wherein the two or more lens assemblies limit numerical apertures of the two or more illumination beams to prevent specular reflection of the two or more illumination beams from entering the objective lens, wherein a respective one of the two or more lens assemblies includes a homogenizer to provide that a respective one of the two or more illumination beams has a second spatial profile with higher spatial uniformity than the first spatial profile according to a selected metric; and
a controller communicatively coupled to the detector, the controller including one or more processors configured to execute program instructions causing the one or more processors to:
receive one or more images of the buried target from the detector; and
generate one or more measurements of the sample based on the one or more images.

2. The darkfield imaging system of claim 1, wherein a respective one of the one or more illumination sources comprises a bare light emitting diodes (LEDs), wherein a respective lens assembly of the two or more lens assemblies comprises:
a field stop, wherein the homogenizer in the respective lens assembly provides the second spatial profile at the field stop; and
a projection lens to image the field stop onto the buried target to provide a respective illumination beam of the two or more illumination beams.

3. The darkfield imaging system of claim 2, wherein the homogenizer in the respective lens assembly comprises:
a waveguide.

4. The darkfield imaging system of claim 3, wherein the waveguide comprises:
a sealing waveguide.

5. The darkfield imaging system of claim 3, wherein the waveguide comprises:
a multi-mode waveguide.

6. The darkfield imaging system of claim 2, wherein the field stop comprises:
an aperture.

7. The darkfield imaging system of claim 2, wherein the field stop is located at an output face of the homogenizer.

8. The darkfield imaging system of claim 7, wherein the field stop and the output face of the homogenizer are tilted to satisfy a Scheimpflug condition, wherein the projection lens images the field stop onto the buried target with an image plane that is coplanar with the buried target.

9. The darkfield imaging system of claim 2, wherein the respective lens assembly further comprises:
an aperture stop at a back focal plane of the projection lens, wherein the respective illumination beam is telecentric to provide uniform incidence angles across the common illumination field.

10. The darkfield imaging system of claim 1, wherein the one or more illumination sources provide spatially coherent light, wherein the illumination sub-system includes two or more optical fibers to couple the spatially coherent light to the two or more lens assemblies.

11. The darkfield imaging system of claim 10, wherein at least one of the one or more illumination sources comprises:
a superluminescent diode.

12. The darkfield imaging system of claim 10, wherein at least one of the two or more optical fibers is a multi-mode optical fiber.

13. The darkfield imaging system of claim 12, wherein the multi-mode optical fiber has at least one of a rectangular, a square, or a hexagonal core.

14. The darkfield imaging system of claim 10, wherein a respective lens assembly one of the two or more lens assemblies comprises:
a collimator lens configured to collect light from an associated one of the two or more optical fibers; and
two Powell lenses with apexes rotated 90 degrees with respect to each other.

15. The darkfield imaging system of claim 14, wherein the respective lens assembly further includes an additional collimator lens after the two Powell lenses.

16. The darkfield imaging system of claim 14, wherein the respective lens assembly further includes a field stop after the two Powell lenses.

17. The darkfield imaging system of claim 1, wherein the one or more processors are further configured to execute program instructions causing the one or more processors to:
receive a dark reference image without the sample;
receive a bright reference image of a plane of the sample at a depth of the buried target, where the buried target is outside a frame of the bright reference image; and
generate a natural uniformity calibration (NUC) reference image based on the bright reference image and the dark reference image.

18. The darkfield imaging system of claim 17, wherein generating the one or more measurements of the sample based on the one or more images comprises:
subtracting the NUC reference image from the one or more images to form one or more calibrated images; and
generating the one or more measurements based on the one or more calibrated images.

19. The darkfield imaging system of claim 1, wherein the selected metric comprises:
at least one of a standard deviation or a variance of intensity across the common illumination field.

20. The darkfield imaging system of claim 1, wherein the one or more measurements comprise:
at least one of a metrology measurement, an inspection measurement, or an alignment measurement.

21. An illumination system comprising:
one or more illumination sources providing temporally incoherent light with a first spatial profile; and
two or more lens assemblies configured to direct the light from the one or more illumination sources as two or more illumination beams to a buried target along optical paths outside an objective lens of an imaging sub-system, wherein the two or more illumination beams fully overlap at the buried target to provide a common illumination field, wherein the two or more lens assemblies limit numerical apertures of the two or more illumination beams to prevent specular reflection of the two or more illumination beams from entering the objective lens, wherein a respective one of the two or more lens assemblies includes a homogenizer to provide that a respective one of the two or more illumination beams has a second spatial profile with higher spatial uniformity than the first spatial profile according to a selected metric.

22. The illumination system of claim 21, wherein the selected metric comprises:
at least one of a standard deviation or a variance of intensity across the common illumination field.

23. A darkfield imaging method comprising:
illuminating, using an illumination sub-system, a buried target within a volume of a sample with two or more illumination beams, wherein the illumination sub-system, comprises:
one or more illumination sources providing temporally incoherent light with a first spatial profile; and
two or more lens assemblies configured to direct the light from the one or more illumination sources as two or more illumination beams to the buried target along optical paths outside an objective lens of an imaging sub-system including an objective lens and a detector, wherein the two or more illumination beams fully overlap at the buried target to provide a common illumination field, wherein the two or more lens assemblies limit numerical apertures of the two or more illumination beams to prevent specular reflection of the two or more illumination beams from entering the objective lens, wherein a respective one of the two or more lens assemblies includes a homogenizer to provide that a respective one of the two or more illumination beams has a second spatial profile with higher spatial uniformity than the first spatial profile according to a selected metric;
generating one or more images of the buried target from the detector; and
generating one or more measurements of the sample based on the one or more images.

24. The darkfield imaging method of claim 23, further comprising:
generating a dark reference image without the sample;

generating a bright reference image of a plane of the sample at a depth of the buried target, where the buried target is outside a frame of the bright reference image; and generating a natural uniformity calibration (NUC) reference image based on bright reference image and the dark reference image.

25. The darkfield imaging method of claim 24, wherein generating the one or more measurements of the sample based on the one or more images comprises:

subtracting the NUC reference image from the one or more images to form one or more calibrated images; and generating the one or more measurements based on the one or more calibrated images.

26. The darkfield imaging method of claim 23, wherein the one or more measurements comprise:

at least one of a metrology measurement, an inspection measurement, or an alignment measurement.

* * * * *